United States Patent

Ramesh et al.

Patent Number: 6,028,538
Date of Patent: Feb. 22, 2000

[54] METHOD, KEYBOARD AND SYSTEM FOR TRANSMITTING KEY CHARACTERS

[75] Inventors: Rajaram Ramesh, Cary; Carlos E. Vidales, Raleigh, both of N.C.; Wayne Stark, Ann Arbor, Mich.

[73] Assignee: Ericsson Inc., Research Triangle Park, N.C.

[21] Appl. No.: 08/948,737

[22] Filed: Oct. 10, 1997

[51] Int. Cl.[7] .................................................. H03K 17/94
[52] U.S. Cl. ............................ 341/24; 341/22; 341/26; 345/168
[58] Field of Search ................................. 341/22, 24, 31, 341/173, 176, 26; 345/168, 169, 172; 395/750.01; 364/707

[56] References Cited

U.S. PATENT DOCUMENTS

| | | | |
|---|---|---|---|
| 5,189,543 | 2/1993 | Lin et al. ................................. | 359/154 |
| 5,515,051 | 5/1996 | Tanaka et al. .......................... | 345/168 |
| 5,585,792 | 12/1996 | Liu et al. ................................. | 341/22 |
| 5,684,471 | 11/1997 | Bernardi et al. ........................ | 341/22 |
| 5,724,106 | 3/1998 | Autrys et al. ........................... | 341/176 |
| 5,737,107 | 4/1998 | Umeda .................................... | 359/146 |
| 5,818,437 | 10/1998 | Grover et al. .......................... | 345/326 |

*Primary Examiner*—Michal Horabik
*Assistant Examiner*—Timothy Edwards, Jr.

[57] ABSTRACT

A method for transmitting key characters representative of keys on a keyboard is provided. A probability of use for one or more of the key characters may be determined by counting the number of occurrences of the key characters for a predetermined time period or for a literary work. Alternatively, the number of occurrences of one or more of the key characters may be calculated in real time and the probability of use adjusted accordingly for the key characters. Based on their calculated probability of use, the key characters are mapped into transmission formats. A system and a keyboard are also disclosed which map key characters into transmission formats based on probability of use of the key characters. Additional methods are disclosed for using error detection data in the transmission formats. Exemplary error detection may include adding parity bits or configuring the data in the transmission formats to indicate errors. Further methods are provided for providing unique addresses in the transmission formats to differentiate between key characters sent from one keyboard and key characters sent from another keyboard.

30 Claims, 3 Drawing Sheets

METHOD, KEYBOARD AND SYSTEM FOR TRANSMITTING KEY CHARACTERS

BACKGROUND OF THE INVENTION

The present invention relates to keyboards and, more particularly, to a system, a keyboard and a method wherein key signals, representative of keystroke information, or key characters, are transmitted encoded in transmission formats based on a probability of use of one or more of the key characters.

Wireless keyboards transmit keystroke information, or key characters, to a computer via pulses of infrared light generated by a light emitting diode (LED). By turning the LED ON and OFF, a string of binary bits representative of the key characters are transmitted to the computer. In one format, a logical '0' bit is represented by an LED ON state and a logical '1' bit is represented by an LED OFF state. Using this format, transmitting a logical '0' bit requires more power than transmitting a logical '1' bit. As those skilled in the art will readily comprehend, the converse format may be used wherein a logical '1' bit is represented by the LED ON state and a logical '0' bit is represented by the LED OFF state. Using this converse format, transmission of a logical '1' bit requires more power than transmission of a logical '0' bit. For clarity and ease of description, only the former format will be described and discussed herein; however, the present invention may be advantageously implemented in conjunction with any transmission format.

Current wireless keyboards employ the same transmission formats, or schemes, used with hardwired keyboards. Typically, each of the keys of a keyboard are treated as a position in a matrix. The index of the matrix position of a particular key character is transmitted to the computer via pulses of light. Although reusing these "hardwire" schemes minimizes the need to write new control software, these schemes are not designed to minimize power consumption during data transmission. For a wireless keyboard, battery capacity is a critical design parameter. By reducing the power consumed when transmitting key characters to the computer, the battery can be advantageously made smaller while maintaining, or even extending, battery life between recharging. Another advantage of reduced power consumption is longer battery life.

Accordingly, there is a need in the art for a system, a keyboard and a method wherein key signals representative of key characters are transmitted in transmission formats which minimize power consumption, which provide error detection and which differentiate between key characters transmitted by different keyboards.

SUMMARY OF THE INVENTION

This need is met by a system, a keyboard and a method in accordance with the present invention wherein transmission formats for key characters are configured to minimize, or reduce, power consumption based on a probability of use for one or more of the key characters. In addition, methods are provided for detecting errors in transmitted signals and for implementing addressing schemes which identify a keyboard to differentiate between key characters transmitted by that keyboard from key characters transmitted by another keyboard.

In accordance with one aspect of the present invention, a probability of use is determined for one or more key characters. The key characters are mapped into transmission formats based on the determined probability of use. As those skilled in the art will readily comprehend, "mapping" means to assign a unique transmission format to each key, or key character, on the keyboard. In the present invention, the key character having the highest probability of use is preferably mapped into the transmission format requiring the least amount of power to transmit. After the transmission formats for the key characters have been established, the key characters are transmitted in key signals encoded in their respective transmission formats.

The transmission formats may take any number of forms, such as being comprised of codewords consisting of one burst of data or two bursts of data. Error detection data may also be included in the transmission formats. One method of error detection data incorporates adding a parity bit to each of the transmission formats. Other error detection methods include designating a predetermined number of logical '0' bits to be including in each transmission format, or portions thereof.

The probability of use may be determined by one of a number of methods. The number of occurrences of one or more of the key characters may be calculated for a predetermined time period, or for a preselected literary work. Alternatively, the number of occurrences of one or more of the key characters may be calculated substantially continually on a real-time basis.

In accordance with another aspect of the present invention, a keyboard, such as a wireless keyboard, comprises a keyboard processing circuit which maps key characters into transmission formats based on probability of use for one or more of the keys. A keyboard interface then transmits the key characters in the transmission formats. An error coding circuit may provide error detecting data in the transmission formats.

A system in accordance with yet another aspect of the present invention comprises a computer and a keyboard wherein key characters are transmitted from the keyboard to the computer in transmission formats configured based on probability of use of one or more of the key characters. A key use circuit determines the probability of use of the one or more key characters using any of the number of methods, as described above. A key mapping circuit then maps the key characters into transmission formats based on the probability of use for the one or more key characters. The key characters are thereafter transmitted between the computer and the keyboard encoded in the transmission formats.

These and other features and advantages of the present invention will become apparent from the following detailed description, the accompanying drawings and the appended claims.

DETAILED DESCRIPTION OF THE INVENTION

Figure 1:
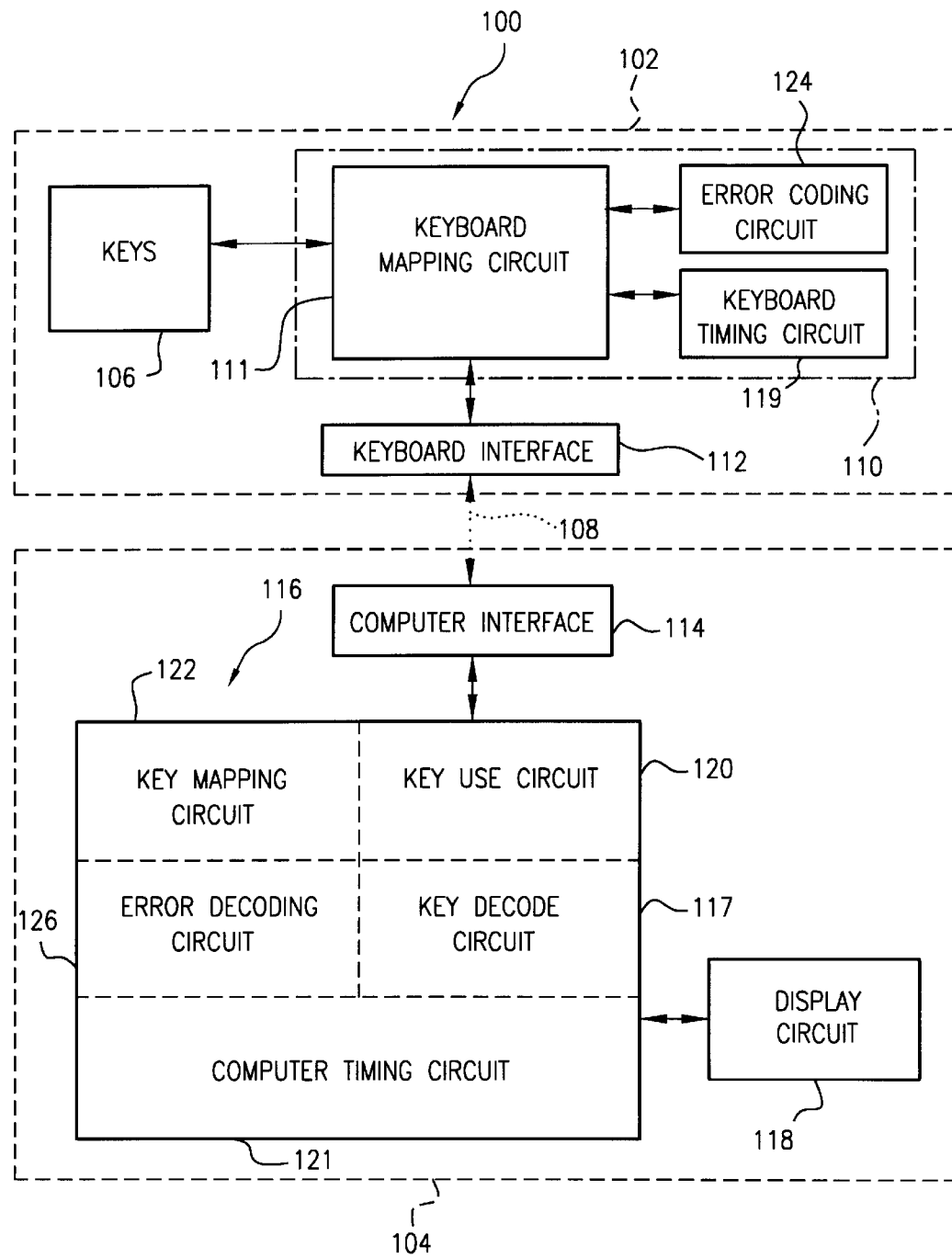
FIG. 1 is a block diagram of a keyboard and computer in accordance with one aspect of the present invention.

A computer system 100 consisting of a keyboard 102 and a computer 104 in accordance with the present invention is shown in block diagram form in FIG. 1. The keyboard 102 transmits key characters representative of keystrokes of keys 106 to the computer 104 via encoded infrared key signals 108 over an air interface. For ease of description and clarity, the numerous aspects of the present invention will be uniformly described herein with reference to a wireless keyboard. However, as those skilled in the art will readily appreciate, the present invention may be advantageously applied to other types of keyboards, such as wired, radiofrequency, magnetic or optically coupled keyboards.

In the keyboard 102, key characters representative of keystrokes of the keys 106 are provided to a keyboard processor unit 110. Using various methods in accordance with the present invention, a keyboard mapping circuit 111 in the keyboard processor unit 110 maps the key characters into transmission formats for transmission via key signals through a keyboard interface 112 to the computer 104. The encoded key signals 108 are received by a computer interface 114 and sent to a computer processing circuit 116. A key decode circuit 117 decodes the encoded key signals 108 and provides the decoded key characters to a software program, such as a word processor, for display by a display circuit 118. The present invention will be described using asynchronous data transmission and, therefore, a keyboard timing circuit 119 and a computer timing circuit 121 are employed in the respective keyboard 102 and computer 104.

In accordance with the present invention, the transmission formats of the key characters are established based on a probability of use of one or more of the key characters. Various methods may be implemented for determining the probability of use of the key characters. For example, a real-time database in the computer 104 may continually count the number of uses of a key character as the keyboard 102 is being used. The computer 104 continually, or periodically, remaps one or more of the key characters based on the updated probability of use of the key characters. The computer 104 provides any new mappings to the keyboard 102 and the keyboard 102 thereafter transmits the key characters accordingly.

Another method consists of storing the number of uses of one or more of the key characters for a predetermined time period and setting the transmission formats based on the probability of use calculated for that time period. A further method in accordance with the present invention comprises counting the number of uses of one or more of the key characters for a particular document and setting the transmission formats based on the probability of use for the document. For ease of description and clarity, only the last mentioned method will be discussed in detail; however, any method, including those described above, for determining a probability of use of key characters may be advantageously employed in the present invention and should be considered part thereof.

As those skilled in the art will readily comprehend, the computation of the probability of use and the mapping of the key characters may be performed in the keyboard 102, in the computer 104 or in any other processing device. If the keyboard 102 determines the probability of use of the key characters and maps the key characters, the resulting transmission formats would be downloaded to the computer 104. Similarly, the computer 104 may determine the probability of use of the key characters, map the key characters into transmission formats and download the formats to the keyboard 102. If another processing device, such as a separate computer, determines the probability of use and maps the key characters, the resulting transmission formats for the key characters would be downloaded to both the computer 104 and the keyboard 102.

For exemplary purposes, the computer system 100 illustrated in FIG. 1 shows circuitry, in block diagram form, in the computer 104 for determining probability of use of the key characters (both in real time and archival), for mapping the key characters into transmission formats and for notifying the keyboard 102 of these transmission formats. In particular, the computer 104 comprises a key use circuit 120 which determines probability of use of the key characters in accordance with the methods delineated below. Based on the probability of use of the key characters, a key mapping circuit 122 maps the key characters into transmission formats. The keyboard 102 is notified by the computer 104 of the transmission formats for the key characters via the computer interface 114. The structure, control and arrangement of the conventional components and circuits have, for the most part, been illustrated in the drawings by readily understandable block representations and schematic diagrams, which show only those specific details that are pertinent to the present invention. In order not to obscure the disclosure with structural details which will be readily apparent to those skilled in the art having the benefit of the description herein.

The computer system 100 may use various methods for detecting errors in transmitted key characters. A keyboard error coding circuit 124 incorporates error detection data into the transmission formats. In the computer 104, an error decoding circuit 126 receives error detection data and uses the error detection data to detect errors in the received bursts of data. As noted, detected errors may be corrected and many methods of error correcting are known in the art. Those skilled in the art will readily be able, in view of this disclosure, to advantageously implement such error correcting methods in the present invention. However, as will be readily apparent to those skilled in the art, the present invention will likely be implemented without error correcting capabilities. Erroneously received burst of data will likely just be ignored and the key character, or characters, will have to be retyped.

Common IR transmitters use asynchronous data transmission consisting of bursts of data comprised of 10 bits. Each 10-bit burst of data ordinarily includes, in succession, a logical '0' start bit, eight (8) bits of information data and a logical '1' stop bit. A typical keyboard transmits over 200 different key characters and, consequently, eight bits of information data are needed to form over 200 unique bit combinations. If more than eight bits of information data are required, the present invention provides for the transmission of multiple 10-bit bursts of data, such as two bursts of data for one or more of the key characters.

It should be noted that the present invention may also be advantageously employed in known IR transmitters which employ bursts of data comprised of eleven (11) bits. Each 11-bit burst of data typically comprises, in succession, a logical '0' start bit, eight (8) bits of information data, a logical '1' stop bit and a parity bit. As is known, the parity bit is used for parity check error detection which typically involves counting the number of logical '1' bits received at the computer 104. For a successful transmission, the number of logical '1' bits is even using even parity and, conversely, is odd using odd parity. Although the present invention will be predominately described with respect to 10-bit bursts of data, a description of an exemplary transmission scheme for implementing the present invention using a 11-bit bursts of data will be provided.

Irrespective of the number of bursts of data employed for a key character, a codeword comprises all the bursts of data required to transmit a key character. For example, a codeword representing the SHIFT key may be comprised of one burst of data or two bursts of data depending upon the transmission format. In aggregate, the codewords of all the key characters are termed a codeset. Although the present invention will be described herein with reference to a transmission scheme employing 10-bit bursts of data, it should be appreciated that any length and format of data may be advantageously employed.

The present invention maps the key characters of the keyboard 102 into transmission formats based on the probability of use of the keys to minimize, or reduce, transmission power consumption. Key characters which are more likely to be used are mapped into transmission formats requiring less transmission power. For example, the key character having the highest probability of use may advantageously be mapped to the transmission format consuming the least transmission power, for example, a single burst of data consisting of a logical '0' start bit, eight logical '1' information data bits and a logical '1' stop bit, assuming a logical '1' is represented by a LED OFF state. Those skilled in the art will readily understand that a LED OFF state is, in effect, just an absence, or zero level, of the key signal.

As indicated, one method of determining the probability of use of the key characters in accordance with the present invention comprises storing a number of occurrences of use of a key character for a predetermined time period or for a particular literary work. For exemplary purposes only, the well known literary work by Sir Arthur Conan Doyle, entitled "The Return of Sherlock Holmes", was analyzed for key character usage. For this analysis, the total number of occurrences of a plurality of key characters was counted and divided by the total key characters of the literary work. The probability of use of some of the key characters are tabulated in Table 1 below.

| Key Character | Probability |
| --- | --- |
| Space | 0.166054 |
| e | 0.09025 |
| t | 0.066528 |
| a | 0.059417 |
| o | 0.057491 |
| i | 0.049832 |
| n | 0.0484414 |
| h | 0.048035 |
| s | 0.0460641 |
| r | 0.0418182 |
| d | 0.0315589 |
| l | 0.0292564 |
| Shift | 0.0248074 |
| u | 0.022236 |
| Return | 0.020861 |

In this example, a logical '0' bit is transmitted via a LED ON, the power used by a codeset is proportional to the number of logical '0's transmitted per key character and the probability of use of each of the key characters. The power cost of a codeset can thus be determined by equation (1):

$$C = \sum_{i=1}^{N} p_i N_o(c_i) \qquad (1)$$

where $p_i$ is the probability of use of a codeword $c_i$ and $N_o(c_i)$ is the number of logical '0' bits in the transmission format of the codeword $c_i$. If the codeword $c_i$ comprises a single burst of data, $N_o(c_i)$ includes at least one logical '0' bit for the start bit. If the codeword $c_i$ comprises two bursts of data, then $N_o(c_i)$ will include at least two logical '0' bits for the two start bits.

Several methods may be implemented for mapping the key characters into codewords having selected transmission formats in accordance with the present invention. As a benchmark, random mapping was implemented using a single 10-bit burst of data for each key character. Based on several trials, the average power cost of such a codeset was calculated to be approximately 4.9 to 5.4 logical '0' bits per key character.

One method for transmitting key characters in accordance with the present invention maps the key characters having the highest probability of use to the codewords containing the fewest number of logical '0' bits. Each key character is transmitted in a single burst of data containing ten bits. Based on the probabilities shown in the Table 1, the 'Space' key character is mapped to the most power efficient codeword which is comprised of a logical '0' start bit, eight logical '1' information data bits and a logical '1' stop bit. Thus, the 'Space' character uses only one LED ON for transmission. The next eight most probable key characters are mapped to transmission formats having a logical '0' start bit, one logical '0' bit in the eight information data bits and a logical '1' stop bit. The remaining key characters are mapped accordingly. Using this method, the resulting codeset has a power cost of approximately 2.2 zeroes per key character. As can be seen, a significant power savings results from using this method over the random method.

Another method in accordance with the present invention provides the capability of detecting errors in the transmission of the key characters. In this method, a well known technique of parity check error detection may be employed. For 11-bit bursts of data, the parity bit is selected to provide the proper parity, either even or odd. However, for 10-bit bursts of data, parity check error detection uses one of the eight bits of information data in each of the 10-bit bursts of data. As a result, a codeset which uses only one 10-bit burst of data for each key character can only accommodate 128 characters with parity check error detection. To provide error detection and accommodate the over 200 key characters of a standard keyboard, two bursts of data are used for some of the key characters.

In accordance with one aspect of the present invention, the number of logical '0' bits in a burst of data indicates to the computer 104 whether a second burst of data is required for a key character. Advantageously, the codeset defined in accordance with one aspect of the present invention may indicate the presence of a second burst of data even if one of the bits in the first burst of data is erroneously received.

In this codeset, the key character having the highest probability of use is mapped to a codeword consisting of a logical '0' start bit, eight logical '1' information data bits and a logical '1' stop bit. The 28 next most probable key characters are mapped to codewords consisting of a logical '0' start bit, six logical '1' and two logical '0' information data bits (in any order) and a logical '1' stop bit. The power cost of each of these 28 codewords is therefore three logical '0' bits. These key characters may be considered a first group of codewords comprised of one burst of data.

The remainder, or second group, of the key characters are mapped to codewords consisting of two bursts of data. In a first transmission scheme in accordance with the present invention, the first burst of data has five logical '0' information data bits and the second burst of data has one logical '0' information data bit. Using this format, there are 448 unique codewords available. As is apparent, not all of these codewords are required to transmit all the key characters of a standard keyboard. The power cost of each of these codewords is eight logical '0' bits including the two logical '0' start bits. Using "The Return of Sherlock Holmes", the power cost of this codeset was calculated to be approximately 2.7 logical '0' bits per key character.

However, as those skilled in the art will readily understand, such a transmission scheme, or codeset, may experience inaccurate results due to errors in transmission. For example, if the first burst of data in a two burst key character is missed and a bit error occurs in the decoding of the second burst of data, the computer 104 may decode the data as being comprised of a logical '0' start bit, six logical '1' and two logical '0' information data bits (in any order) and a logical '1' stop bit. Accordingly, the burst of data may thus be erroneously decoded as one of the 28 next most probable key characters.

In a second, and preferred, codeset which significantly reduces the probability of such an error in accordance with the present invention, the first burst of data has five logical '0' information data bits and the second burst of data has four logical '0' information data bits. The three addition logical '0' information data bits in this second codeset should only minimally increase the power cost of the transmission scheme since the key characters requiring two burst of data are, by definition, the least likely to occur. As those skilled in the art will readily comprehend, other mapping methods may be advantageously employed in the present invention and should be considered under the scope of this disclosure.

Advantageously, these codesets provide inherent error detection in accordance with yet another aspect of the present invention. If the number of logical '0' bits detected in the information data bits of the first burst of data is 1, 3, 4, 6, 7 or 8, an error has occurred. In this method, the number of logical '0' bits in the first burst of data also gives an indication of whether a second burst of data is contained in a codeword. If the number of logical '0' bits detected in the information data of the first burst of data is 4, 5, 6, 7 or 8, a second burst of data is likely contained in the codeword. Consequently, if the number of logical '0' bits in a first burst of data is 4, 6, 7 or 8, an error has occurred and a second burst of data is forthcoming. In such a case, both the first and second bursts of data need to be ignored or corrected, if error correction is being applied. Conversely, if the number of logical '0' bits detected in the information data of the first burst of data is equal to 1 or 3, there is no second burst of data in the codeword.

Further error detection is provided in the second burst of data. For the first codeset, if the number of logical '0' bits detected in the information data of the second burst of data is 0 or 2, an error is detected. Similarly, for the second codeset, if the number of logical '0' bits detected in the information data of the second burst of data is 3 or 5, an error is detected.

Figure 2:
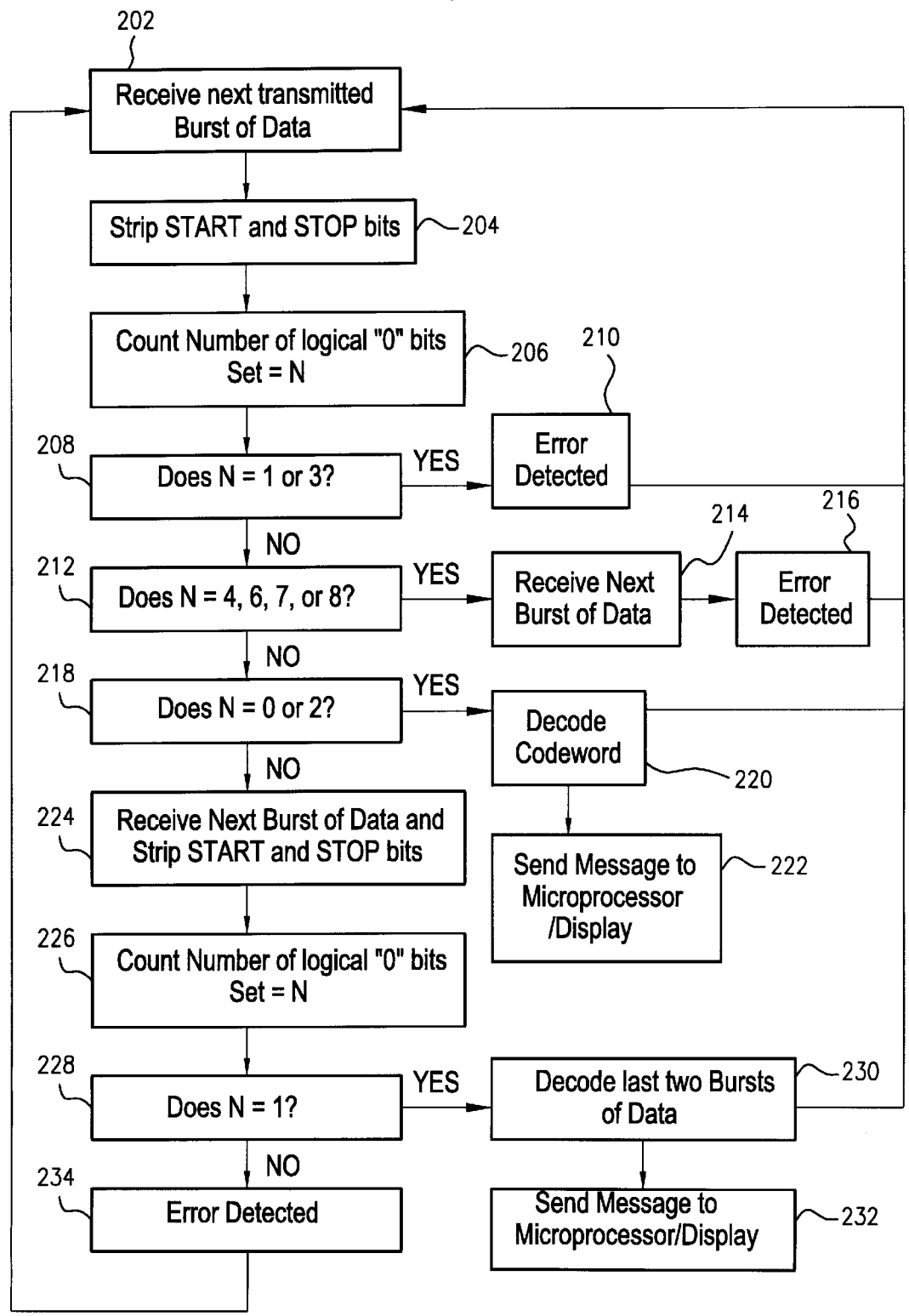
FIG. 2 is a flowchart illustrating an exemplary method for transmitting and decoding key characters encoded in transmission formats between the computer and keyboard shown in FIG. 1.

A flowchart depicting an exemplary sequence for receiving bursts of data using the aforementioned first codeset is shown in FIG. 2. The methods for receiving bursts of data disclosed herein assume that a one bit error is the most likely error to occur in deciphering a received burst of data. As those skilled in the art will readily comprehend, the present invention may be readily modified to account for other assumptions, such as assuming two bit errors and the like. A burst of data is received in step 202 and the START and STOP bits are removed in step 204. The number of logical '0' bits is determined in the remaining 8 information data bits and the resulting number is set equal to a variable N in step 206. In step 208, it is determined whether N equals 1 or 3. If N does equal 1 or 3, an error is detected at step 210 and the next burst of data is received in step 202.

In step 212, it is determined whether N equals 4, 6, 7 or 8. If so, the next burst of data is received in step 214 and an error is detected in step 216. If N is not equal to 4, 6, 7 or 8, it is determined whether N equals 0 or 2 in step 218. If N does equal 0 or 2, then the codeword (first burst of data) is decoded in step 220 and the decoded codeword sent to the computer processor circuit or display circuit in step 222.

If N does not equal 0 or 2, the next burst of data is received, in step 224, and the START and STOP bits are stripped. The number of logical '0' bits in the information data in the next (or second) burst of data is determined and set equal to N in step 226. If N equals 1 in step 228, the second burst of data has been validly received and the first and second bursts of data (codeword) are decoded in step 230. The decoded codeword is sent to the computer processor circuit in step 232. If N does not equal 1, the second burst of data has been erroneously received in step 234. The next burst of data is then received in step 202.

Although not shown, those skilled in the art will readily understand that for the second codeset having four logical '0' information data bits in the second burst of data in accordance with the present invention similar steps may be employed. For the second codeset at step 226, the number of logical '0' bits in the information data in the next (or second) burst of data is determined and set equal to N. Step 228 is modified so that if N equals 4, the second burst of data has been validly received and the first and second bursts of data (codeword) are decoded in step 230. Step 234 is modified so that if N does not equal 4, the second burst of data has been erroneously received.

One problem associated with using wireless keyboards is the potential for interference from other wireless keyboards operating in the surrounding area. In order to differentiate between different keyboards who are using the same transmission scheme, such as those described above, addressing schemes are provided in accordance with the present invention. A unique keyboard address is assigned to each keyboard based on the addressing scheme being implemented. In the present invention, two types of addressing schemes are disclosed—explicit addressing wherein a keyboard address is inferred based on a transmitted set of bits and implicit addressing wherein a keyboard address is implied by the set of codewords being used without the address being explicitly contained in any field of the codewords.

In a first explicit addressing scheme, an address burst of data, or byte, consisting of a logical '0' START bit and a logical '0' bit is added to the beginning of each codeword. As is evident, this adds two logical '0' bits to each codeword of the codeset. Consequently, the average power cost of the first and second codeset (as described previously) with this addressing scheme is approximately 4.7 logical '0' bits per key character.

Figure 3:
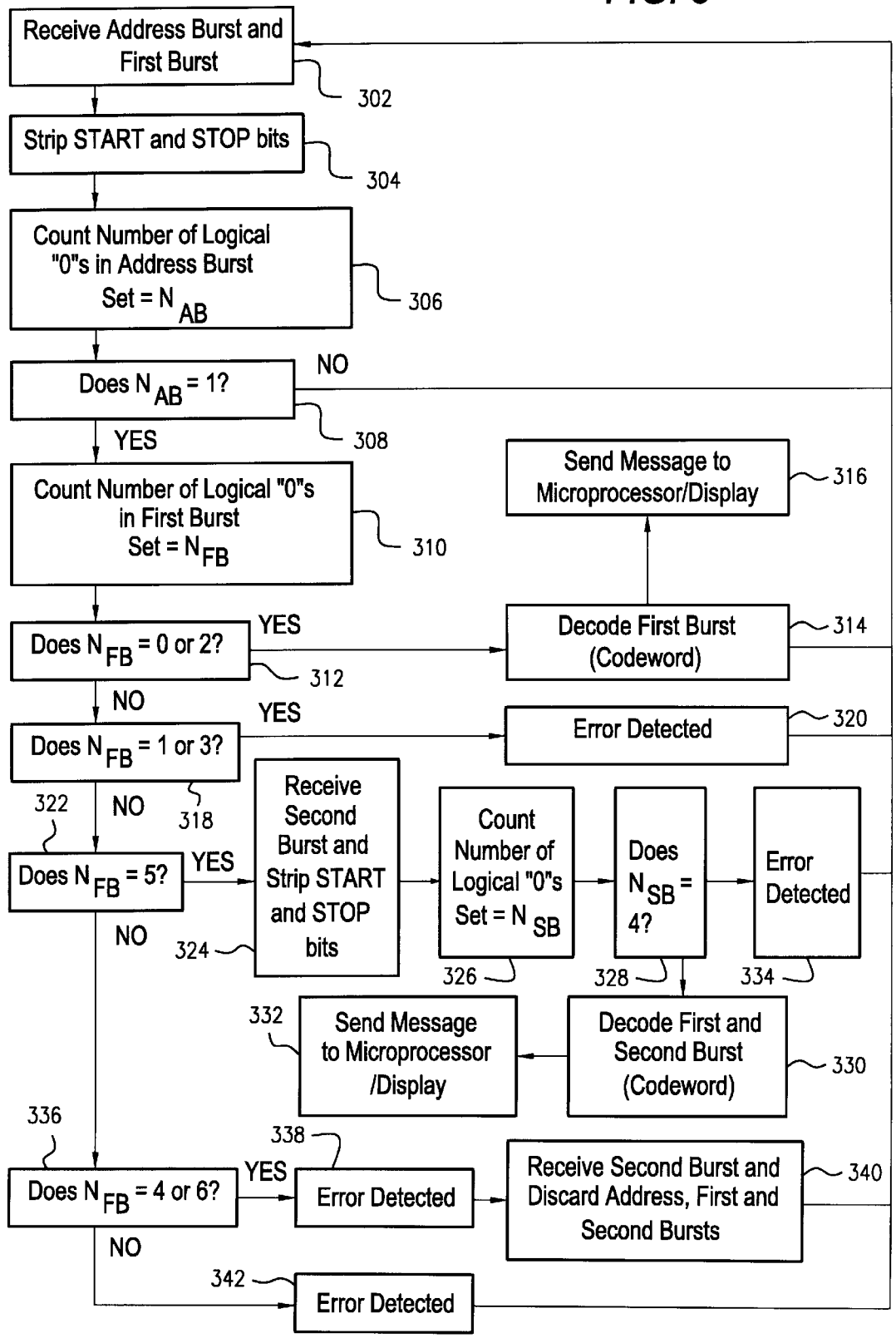
FIG. 3 is a flowchart illustrating a preferred exemplary method for transmitting and decoding key characters encoded in transmission formats between the computer and keyboard shown in FIG. 1.

A flowchart of an exemplary method for decoding codewords using the above addressing scheme is shown in FIG. 3. In this example, the codewords are encoded in accordance with the preferred second codeset described above and, therefore, codewords comprising two bursts of data have four logical '0' bits in their second burst of data.

In steps 302 and 304, an address burst of data and a first burst of data are received and the START and STOP bits are removed. The number of logical '0' bits in the address burst of data is determined and set equal to the address variable $N_{AB}$, in step 306. As noted above, the address burst of data should contain one logical '0' START bit and a logical '0' bit. Consequently, after the START bit is stripped in step 304, the address burst of data should contain one logical '0' bit, or the address variable $N_{AB}$ should equal one. In step 308, it is determined whether the address variable $N_{AB}$ equals one. If not, the received bursts of data (address and first bursts) are discarded and the method returns to step 302. If the address variable $N_{AB}$ is one, the number of logical '0' bits in the first burst of data is determined and set equal to a first variable $N_{FB}$, in step 310.

It is then determined whether the first variable $N_{FB}$ is equal to zero or two in step 312. In accordance with the second codeset defined above, codewords having zero or two logical '0' bits in the first burst of data are valid and consist of only the first burst of data. Consequently, if the first variable $N_{FB}$ is equal to zero or two in step 312, the first burst of data is decoded and the decoded message sent to a microprocessor or display, in respective steps 314 and 316. If the first variable $N_{FB}$ does not equal zero or two, it is determined whether the first variable $N_{FB}$ is equal to one or three in step 318. If so, then an error has been detected in step 320 and the method returns to step 302.

If the first variable $N_{FB}$ is not equal to one or three in step 318, it is next determined whether the first variable $N_{FB}$ is equal to five in step 322. As noted previously, codewords comprised of two bursts of data include a first burst of data containing five logical '0' bits. Accordingly, if the first variable $N_{FB}$ does equal five, a second burst of data is received and its START and STOP bits are stripped in step 324. The number of logical '0' bits is counted and set equal to a second variable $N_{SB}$ in step 326. If the second variable $N_{SB}$ is determined to equal four, in step 328, the first and second bursts of data are decoded, in step 330, and the resulting decoded message sent to a display in step 332.

If the second variable $N_{SB}$ is not equal to four in step 328, an error has been detected in step 334 and the method returns to step 302. Returning to step 322, if the first variable $N_{FB}$ is not equal to five, it is determined whether the first variable $N_{FB}$ is equal to four or six in step 336. If so, an error has been detected in step 338. As noted, a valid first burst of data for a codeword comprising two bursts of data has five logical '0' bits. As those skilled in the art will appreciate, a detected value for the first variable $N_{FB}$ of four or six is likely the result of an error in receiving a codeword comprised of two bursts of data. Consequently, in step 340 a second burst of data is received and the address, first and second bursts of data are discarded. The method then returns to step 302. If the first variable $N_{FB}$ does not equal four or six in step 336, an error is detected in step 342 and the method returns to step 302 to await the next bursts of data. The steps shown in the flowcharts contained herein are exemplary only and may be readily reordered by those skilled in the art. All such configurations of the steps shown in the figures should be considered within the scope of the invention.

Such an explicit addressing scheme may also be advantageously implemented in a transmission format which employs 11-bit first and second bursts of data. Although even parity is preferred as discussed below, those skilled in the art will be readily able to implement the explicit addressing scheme using odd parity. However, for odd parity, an even number of logical '0' bits need to be transmitted in the address burst of data. For example, an additional logical '0' bit could be added to the address burst of data so that the total number of logical '0' bits in the address, first and second bursts of data is odd. Unfortunately, adding a logical '0' bit concomitantly increases the average power cost of the codeset. If such an odd parity scheme is employed, the average power cost of the codeset is approximately 5.73 logical '0' bits per key character.

The explicit addressing scheme disclosed above consists of codewords which always have a first burst of data containing an even number of logical '0' bits and a second burst of data containing an odd number of logical '0' bits. Since the address burst of data always has a single logical '0' bit, this transmission scheme is well suited to even parity.

In an exemplary transmission scheme in accordance with the present invention, the following method may be used to decode the codewords. It is again assumed that the START and STOP bits have been stripped. If the received address and first bursts of data, in combination, have one logical '0' bit and the second burst of data has an even number of logical '0' bits, the codeword has been correctly received and is decoded. If the received address and first bursts of data, in combination, have an even number of logical '0' bits and the second burst of data has an even number of logical '0' bits, an error has occurred. Similarly, if the received address and first bursts of data, in combination, have an odd number of logical '0' bits and the second burst of data has an odd number of logical '0' bits, an error has occurred. An attempt may be made to correct the errors using any of a number of well known error correction techniques, however, it is contemplated that the erroneously received bursts of data will just be discarded.

Finally, if the received address and first bursts of data, in combination, have an even number of logical '0' bits and the second burst of data has an odd number of logical '0' bits, a synchronization error has occurred. In particular, a synchronization error typically results when the received address and first bursts of data is actually a second bursts of data from a previous codeword and the received second burst of data is actually an address and first burst of data from a subsequent codeword. Two exemplary methods for handling synchronization error may be employed. First, the received second burst of data may be retained and used as the address and first bursts of data of the next codeword. Alternatively, the next received burst of data may be discarded and the method begins anew thereafter.

In accordance with the present invention, an implicit addressing scheme for multiple method keyboards may be implemented in the following manner. The following example assumes the need to discriminate between 4 to 8 wireless keyboards. Each of the codewords representative of key characters consist of two bursts (or bytes) of data. Omitting, for ease of description, the logical '0' START bit and the logical '1' STOP bit which are included in each burst of data, the following exemplary formats, or number of logical '0' bits, for the eight information data bits contained in each burst of data may be used for the codewords:

| Number of Codewords | Logical '0' Bits in First Burst | Logical '0' Bits in Second Burst |
| --- | --- | --- |
| 8 | 1 | 0 |
| 56 | 3 | 0 |
| 224 | 1 | 2 |
| 1568 | 3 | 2 |
| 560 | 1 | 4 |

In accordance with the present invention, the codewords are partitioned into sets for each keyboard. Numerous partition criteria may be applied in formulating the sets. For example, codewords may be partitioned among the sets by the power cost of each codeword. Each set may be assigned to a keyboard based on keyboard serial numbers or any other criteria. Advantageously, each codeword in the above codeset has an odd number of logical '0' bits in the first burst of data and an even number of logical '0' bits in the second burst of data. Therefore, synchronization by the computer can be accomplished based on the detection of whether an even or odd number of logical '0' bits are received. For eight keyboards, the average power cost of each of the eight sets is approximately 4.67 logical '0' bits per key character. If only four keyboards are used, the average power cost of each of the four sets is approximately 4.48 logical '0' bits per key character.

Using the implicit addressing scheme, an exemplary method for decoding signals representative of key characters received by a computer consists of the following. If a received first burst of data contains one or three logical '0' bits and a received second burst of data contains zero, two or four logical '0' bits, the codeword has been correctly received and is decoded. If received first and second bursts of data both contain an odd number of logical '0' bits or an even number of logical '0' bits, an error has occurred. If a received first burst of data contains an even number of logical '0' bits and a received second burst of data contains an odd number of logical '0' bits, there is a synchronization error. Such a synchronization error may be handled as described above with respect to the explicit addressing scheme for an 11-bit transmission scheme.

Yet another second explicit addressing scheme in accordance with the present invention comprises using some of the bits in the above implicit addressing scheme as explicit addresses. For example, the first burst of data in the codewords is divided into a logical '0' START bit, a four bits address section, a four bits of information data and a logical '1' STOP bit. The second burst of data contains the already described logical '0' START bit, eight bits of information data and one logical '1' STOP bit. Unique addressing is accomplished by placing a single logical '0' bit in a predetermined position in the four bit addressing section of the first burst of data. Although this specific scheme is designed for four keyboards, those skilled in the art will readily be able to modify the scheme to accommodate either more or less keyboards in accordance with the present invention.

Omitting, for ease of description, the logical '0' START bit and the logical '1' STOP bit which are included in each burst of data, the following exemplary formats for the eight information data bits contained in each burst of data may be used for the codewords in accordance with the second explicit addressing scheme.

| Number of Codewords | Number of Logical '0's in Addressing Section of First Burst | Number of Logical '0's in Four Info Bits in First Burst | Number of Logical '0's in Eight Info Bits in Second Burst |
| --- | --- | --- | --- |
| 1 | 1 | 0 | 0 |
| 6 | 1 | 2 | 0 |
| 28 | 1 | 0 | 2 |
| 168 | 1 | 2 | 2 |
| 70 | 1 | 0 | 4 |

Using 256 of these codewords, an average power cost of approximately 4.67 logical '0' bits per key character is obtained.

As those skilled in the art will readily appreciate, these exemplary methods detect errors in a simple, efficient manner. Although these methods do not provide for correcting errors, well known methods for correcting errors may be readily implemented by those skilled in the art.

Having thus described the invention in detail by way of reference to various embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. A method for transmitting key characters representative of keys on a keyboard comprising the steps of:

determining a probability of use for the key characters;

mapping the key characters into transmission formats based on the probability of use of the key characters; and transmitting the key characters from the keyboard in the transmission formats.

2. The method as recited in claim 1 wherein the step of determining comprises the step of:

storing a number of occurrences of one or more of the key characters.

3. The method as recited in claim 1 wherein the step of mapping comprises the step of:

mapping one of the key characters having the highest probability of use to one of the transmission formats consuming a least amount of transmission power.

4. The method as recited in claim 1 wherein the step of transmitting comprises the step of:

transmitting the key characters over an air interface.

5. The method as recited in claim 4 wherein the step of transmitting comprises the step of:

transmitting the key characters using one of magnetic, radiofrequency, optical, electrical and infrared coupling.

6. The method as recited in claim 1 wherein the step of mapping comprises the step of:

incorporating error detection data in the transmission formats.

7. The method as recited in claim 6 wherein the step of incorporating error detection comprises the step of:

configuring each of the transmission formats to contain a number of logical '0' bits, the number of logical '0' bits in each of the transmission formats providing error detection.

8. The method as recited in claim 6 wherein the step of incorporating error detection data comprises the step of:

incorporating parity checking in the transmission formats.

9. The method as recited in claim 1 wherein the step of mapping comprises the step of:

configuring codewords each of which is representative of one of the key characters.

10. The method as recited in claim 9 wherein the step of configuring codewords comprises the steps of:

dividing the codewords into sets;

assigning one of the sets to the keyboard to identify the keyboard; and transmitting the key characters using the one of the sets of the codewords assigned to the keyboard.

11. The method as recited in claim 9 wherein the step of configuring codewords comprises the step of:

configuring each of the codewords as one or more bursts of data.

12. The method as recited in claim 9 wherein the step of configuring codewords comprises the step of:

configuring a first group of the codewords consisting of a first burst of data.

13. The method as recited in claim 12 wherein the step of configuring codewords comprises the step of:

configuring a second group of the codewords consisting of the first burst of data and a second burst of data.

14. The method as recited in claim 13 wherein the step of configuring codewords comprises the step of:
  indicating in the first burst of data for any one of the codewords whether the one of the codewords consists of the first and second bursts of data.

15. The method as recited in claim 11 wherein the step of configuring comprises the step of:
  configuring the one or more bursts of data in one or more predetermined lengths.

16. The method as recited in claim 11 wherein the step of configuring the codewords comprises the step of:
  configuring the codewords as a first burst of data and a second burst of data.

17. The method as recited in claim 16 wherein the step of configuring the codewords comprises the steps of:
  designating one or more bits in the first burst of data as an address section; and
  positioning at least one logical '0' bit in the address section to identify the keyboard.

18. The method as recited in claim 16 further comprising the step of:
  providing an address burst of data prior to the first burst of data in the at least one codeword, the address burst of data identifying the keyboard.

19. The method as recited in claim 18 wherein the step of configuring the codewords comprises the step of:
  configuring each of the codewords such that a number of logical '0' bits in the address, first and second bursts of data provides error detection.

20. The method as recited in claim 19 wherein the step of configuring the codewords comprises the step of:
  configuring each of the codewords such that the number of logical '0' bits in the address, first and second bursts of data is even.

21. The method as recited in claim 20 wherein the step of storing comprises the step of:
  updating the number of occurrences of use of the one or more of the key characters.

22. The method as recited in claim 21 wherein the step of mapping comprises the step of:
  periodically remapping the key characters into the transmission formats based on the updating of the number of occurrences of use of the one or more of the key characters.

23. A keyboard for transmitting key characters representative of keys, one or more of the key characters being characterized by a probability of use, the keyboard comprising:
  a keyboard processing circuit for receiving the key characters and for mapping the key characters into transmission formats based on the probability of use of the one or more of the key characters; and
  a keyboard interface for transmitting the key characters in the transmission formats.

24. The keyboard as recited in claim 23 wherein the keyboard interface transmits the key characters over an air interface.

25. The keyboard as recited in claim 23 wherein the keyboard interface transmits the key characters by one of magnetic, radiofrequency and optical coupling.

26. The keyboard as recited in claim 23 wherein the keyboard processing circuit comprises:
  an error coding circuit for providing error detection data in the transmission formats.

27. A system consisting of a computer and a keyboard for transmitting key characters to the computer, the system comprising:
  a key use circuit for determining a probability of use of the key characters;
  a key mapping circuit for mapping the key characters into transmission formats based on the probability of use of the key characters, the transmission formats being used to transmit the key characters between the keyboard and the computer.

28. The system as recited in claim 27 comprising:
  an error coding circuit for encoding the transmission formats with error detection data.

29. The system as recited in claim 27 comprising:
  a keyboard interface for transmitting the key characters from the keyboard to the computer over an air interface.

30. The system as recited in claim 27 comprising:
  a keyboard interface for transmitting the key characters from the keyboard to the computer by one of magnetic, radiofrequency and optical coupling.

* * * * *